(12) United States Patent
Dang

(10) Patent No.: US 7,653,132 B2
(45) Date of Patent: Jan. 26, 2010

(54) METHOD AND SYSTEM FOR FAST IMPLEMENTATION OF SUBPIXEL INTERPOLATION

(75) Inventor: Philip P. Dang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 930 days.

(21) Appl. No.: 11/096,906

(22) Filed: Apr. 1, 2005

(65) Prior Publication Data

US 2006/0133506 A1 Jun. 22, 2006

Related U.S. Application Data

(60) Provisional application No. 60/638,232, filed on Dec. 21, 2004.

(51) Int. Cl.
*H04N 7/12* (2006.01)

(52) U.S. Cl. ............ 375/240.12; 375/240; 375/240.01; 375/240.25

(58) Field of Classification Search ............... 375/240, 375/240.01, 240.12, 240.16, 240.17, 240.25; 348/277
See application file for complete search history.

(56) References Cited

U.S. PATENT DOCUMENTS 6,950,469 B2 * 9/2005 Karczewicz et al. ... 375/240.17
7,206,021 B2 * 4/2007 Sasaki et al. ................ 348/277

* cited by examiner

*Primary Examiner*—Allen Wong
(74) *Attorney, Agent, or Firm*—Lisa K. Jorgenson; William A. Munck

(57) ABSTRACT

A subpixel interpolator includes an input memory capable of storing video information formed from full pixels. The subpixel interpolator also includes at least one interpolation unit capable of performing subpixel interpolation to generate half-pixels and quarter-pixels in parallel. Multiple half-pixels and multiple quarter-pixels are generated concurrently during the subpixel interpolation. In addition, the subpixel interpolator includes an output memory capable of storing at least some of the full pixels, half-pixels, and quarter-pixels. In some embodiments, the at least one interpolation unit includes a horizontal half-pixel interpolation unit, two vertical half-pixel interpolation units, and a quarter-pixel interpolation unit, all of which may operate in parallel. In particular embodiments, the interpolation units are formed from adders and shifters and do not include any multipliers.

20 Claims, 7 Drawing Sheets

METHOD AND SYSTEM FOR FAST IMPLEMENTATION OF SUBPIXEL INTERPOLATION

CROSS-REFERENCE TO RELATED APPLICATIONS

This application claims priority under 35 U.S.C. §119(e) to U.S. Provisional Patent Application No. 60/638,232 filed on Dec. 21, 2004, which is hereby incorporated by reference.

TECHNICAL FIELD

This disclosure is generally directed to video compression systems and more specifically to a method and system for fast implementation of subpixel interpolation.

BACKGROUND

Image compression systems are becoming more and more useful in various applications. For example, video compression is often used to compress video information for storage on a digital versatile disc (DVD) or a hard disk drive (HDD). As another example, video compression is often used during real-time streaming of video information over a network or communication channel, such as the Internet, a digital subscriber line (DSL), a direct broadcast satellite (DBS) system, multimedia services over packet networks (MSPN), and cable television (CATV) networks. In addition, video compression is used in many other applications, such as computer games, video games, videoconferencing systems, videophones, interactive storage media (ISM), and remote video surveillance (RVS) systems.

Several video compression standards have been developed in the last two decades. One of the latest standards is the International Telecommunication Union-Telecommunications (ITU-T) H.264 standard. The H.264 standard is also known as Advanced Video Coding (AVC) or Moving Picture Experts Group 4 (MPEG-4) Part 10. The H.264 standard provides many benefits over previous standards, including improved rate distortion and lower bit rates. Among its features, the H.264 standard supports subpixel motion compensation.

Subpixel motion compensation is often computationally complex and computationally intensive. Because of this, the use of subpixel motion compensation, as part of the H.264 standard or other standard, often requires large amounts of processing time and resources. As a result, its use typically slows the performance of video compression and/or decompression systems.

SUMMARY

This disclosure provides a method and system for fast implementation of subpixel interpolation.

In a first embodiment, a method includes receiving video information comprising full pixels. The method also includes performing subpixel interpolation to generate half-pixels and quarter-pixels in parallel. Multiple half-pixels and multiple quarter-pixels are generated concurrently during the subpixel interpolation.

In a second embodiment, a subpixel interpolator includes an input memory capable of storing video information formed from full pixels. The subpixel interpolator also includes at least one interpolation unit capable of performing subpixel interpolation to generate half-pixels and quarter-pixels in parallel. Multiple half-pixels and multiple quarter-pixels are generated concurrently during the subpixel interpolation. In addition, the subpixel interpolator includes an output memory capable of storing at least some of the full pixels, half-pixels, and quarter-pixels.

In a third embodiment, a system includes a source of video information comprising full pixels and a subpixel interpolator. The subpixel interpolator includes an input memory capable of storing the full pixels. The subpixel interpolator also includes at least one interpolation unit capable of performing subpixel interpolation to generate half-pixels and quarter-pixels in parallel. Multiple half-pixels and multiple quarter-pixels are generated concurrently during the subpixel interpolation. In addition, the subpixel interpolator includes an output memory capable of storing at least some of the full pixels, half-pixels, and quarter-pixels.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
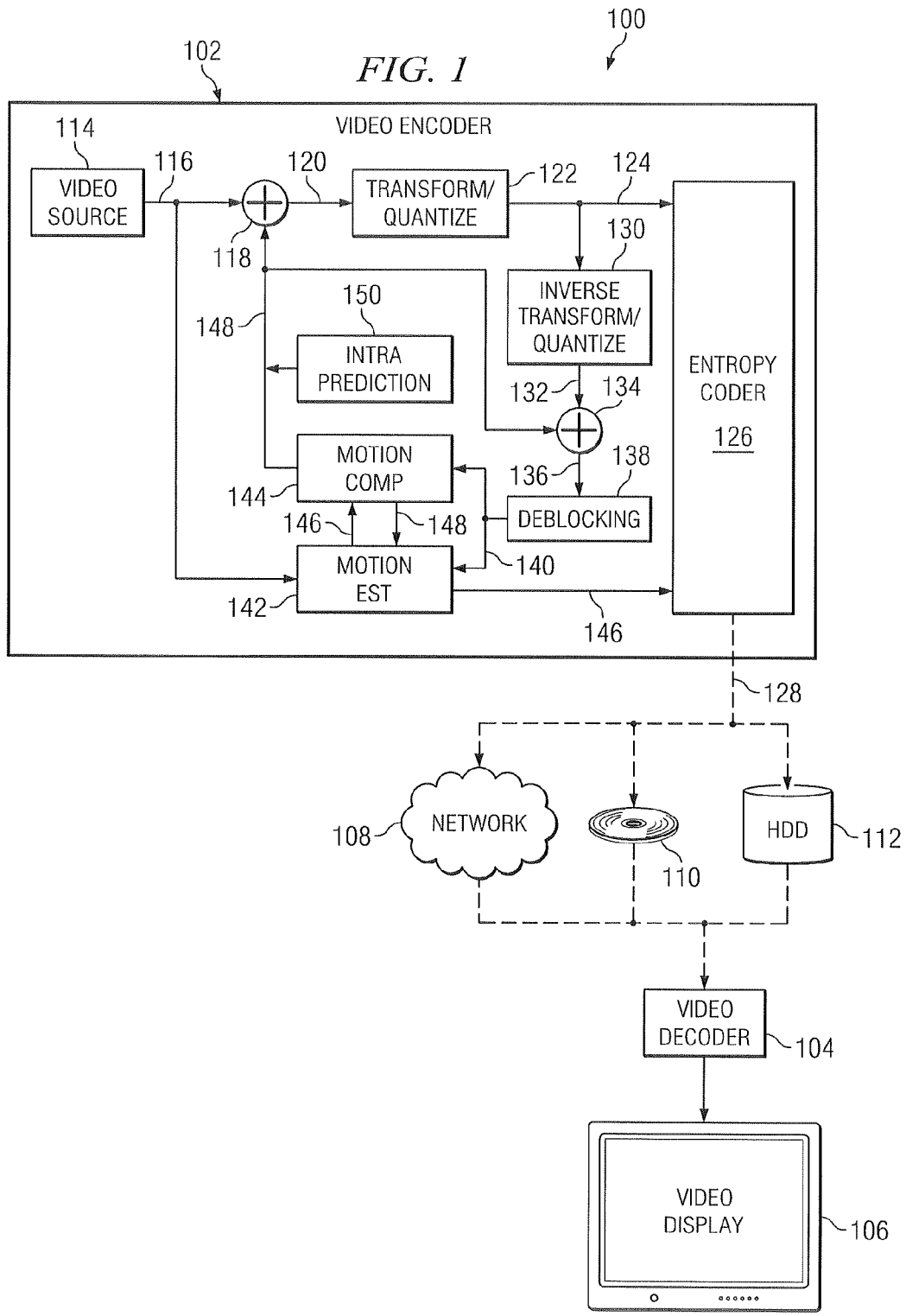
FIG. 1 illustrates an example video system according to one embodiment of this disclosure.

FIG. 1 illustrates an example video system 100 according to one embodiment of this disclosure. In the illustrated example, the system 100 includes a video encoder 102, a video decoder 104, and a display device 106. The video system 100 shown in FIG. 1 is for illustration only. Other embodiments of the video system 100 may be used without departing from the scope of this disclosure.

In one aspect of operation, the video encoder 102 compresses video information, and the video decoder 104 receives and decompresses the video information. For example, the video encoder 102 and the video decoder 104 may each support the International Telecommunication Union-Telecommunications (ITU-T) H.264 standard. To implement the H.264 standard or other compression scheme, the video encoder 102 and the video decoder 104 are capable of performing subpixel interpolation. Subpixel interpolation allows the video encoder 102 and the video decoder 104 to identify and operate on subpixels or fractional pixels for images being compressed or decompressed. The subpixels or fractional pixels are identified using pixels contained in the images being compressed or decompressed.

In some embodiments, the video encoder 102 and the video decoder 104 each includes one or more subpixel interpolation units and a memory arrangement. The interpolation units generate the subpixels by performing interpolation using the original image pixels, and the memory arrangement stores the values of the various pixels and subpixels. The interpolation units are capable of operating in parallel, which helps to reduce the amount of time needed to perform the interpolation process. In addition, the memory arrangement helps to decrease the number of load and store operations during the interpolation process, which also helps to reduce the amount of time needed to perform the interpolation process.

In the illustrated example, the video encoder 102 generates compressed video information. In this document, the phrase "video information" refers to information representing a sequence of video images. The video encoder 102 represents any suitable apparatus, system, or mechanism for producing or otherwise providing compressed video information. For example, the video encoder 102 could represent a streaming-video transmitter capable of transmitting streaming video to a video decoder 104 over a data network 108, such as the Internet, a digital subscriber line (DSL), a wireless network, a direct broadcast satellite (DBS) system, multimedia services over packet networks (MSPN), and a cable television (CATV) network. The video encoder 102 could also represent a digital versatile disc (DVD) burner or other optical disc burner capable of storing compressed video information on a DVD or other optical disc 110. The video encoder 102 could further represent a digital video recorder capable of compressing video information for storage on a hard disk drive (HDD) 112. The video encoder 102 includes any hardware, software, firmware, or combination thereof for compressing video information.

The video decoder 104 decompresses the compressed video information provided by the video encoder 102. The video decoder 104 represents any suitable apparatus, system, or mechanism for decompressing video information. For example, the video decoder 104 could represent a streaming-video receiver capable of receiving streaming video from the video encoder 102 over a network 108. The video decoder 104 could also represent a DVD player or other optical disc player capable of retrieving compressed video information from an optical disc 110. The video decoder 104 could further represent a digital video recorder capable of decompressing video information stored on a hard disk drive 112. The video decoder 104 includes any hardware, software, firmware, or combination thereof for decompressing video information.

In the illustrated example, the video decoder 104 decompresses the compressed video information and provides the decompressed video information to a display device 106 for presentation to a viewer. The display device 106 represents any suitable device, system, or structure for presenting video information to one or more viewers. The display device 106 could, for example, represent a television, computer monitor, or projector. The video decoder 104 could provide the decompressed video information to any other or additional destination(s), such as a video cassette player (VCR) or other recording device.

While shown in FIG. 1 as separate components, the video encoder 102 and the video decoder 104 could operate within a single device or apparatus. For example, the video encoder 102 and the video decoder 104 could operate within a digital video recorder or other device. The video encoder 102 could receive and compress video information for storage on the hard disk drive 112, and the video decoder 104 could retrieve and decompress the video information for presentation.

In the illustrated embodiment, the video encoder 102 includes a video source 114. The video source 114 provides a video information signal 116 containing video information to be compressed by the video encoder 102. The video source 114 represents any device, system, or structure capable of generating or otherwise providing uncompressed video information. The video source 114 could, for example, include a television receiver, a VCR, a video camera, a storage device capable of storing raw video data, or any other suitable source of video information. While FIG. 1 illustrates the video source 114 as forming part of the video encoder 102, the video source 114 could also reside outside of the video encoder 102.

A combiner 118 is coupled to the video source 114. In this document, the term "couple" and its derivatives refer to any direct or indirect communication between two or more elements, whether or not those elements are in physical contact with one another. The combiner 118 receives the video information signal 116 containing uncompressed video information from the video source 114. The combiner 118 also receives a feedback video signal 148 from other components in the video encoder 102. The feedback video signal 148 is associated with video information that has already been compressed by the video encoder 102. The combiner 118 identifies any differences between the video information signal 116 and the feedback video signal 148. The combiner 118 then outputs the identified differences as a residual signal 120. The combiner 118 represents any hardware, software, firmware, or combination thereof for combining signals, such as a subtractor.

The residual signal 120 is provided to a transform/quantize unit 122. The transform/quantize unit 122 implements various functions to process the residual signal 120. For example, the transform/quantize unit 122 may implement a transform function to convert the residual signal 120 (in the spatial domain) into discrete cosine transform (DCT) coefficients (in the frequency domain). The transform/quantize unit 122 may also quantize the DCT coefficients and output quantized DCT coefficients 124. In some embodiments, the transform/quantize unit 122 operates on blocks of pixels from images being compressed (such as 16×16 macroblocks) and produces blocks of quantized DCT coefficients 124. The transform/quantize unit 122 includes any hardware, software, firmware, or combination thereof for transforming and quantizing video information.

The quantized DCT coefficients 124 are provided to an entropy encoder 126. The entropy encoder 126 encodes the quantized DCT coefficients 124 (along with other information) to produce compressed video information 128. The entropy encoder 126 may implement any suitable encoding technique, such as context adaptive based arithmetic coding (CABAC) and/or context adaptive variable length coding (CAVLC). The entropy encoder 126 includes any hardware, software, firmware, or combination thereof for encoding quantized DCT coefficients 124 and other information.

The quantized DCT coefficients 124 are provided to an inverse transform/quantize unit 130. The inverse transform/quantize unit 130 processes the quantized DCT coefficients 124 and attempts to reverse the processing performed by the transform/quantize unit 122. For example, the inverse transform/quantize unit 130 could implement an inverse quantization function to produce DCT coefficients. The inverse transform/quantize unit 130 could also implement an inverse-DCT transform to produce a reconstructed residual signal 132. The reconstructed residual signal 132 might match the original residual signal 120, or the reconstructed residual signal 132 may be similar to the residual signal 120 but have some differences. The inverse transform/quantize unit 130 includes any hardware, software, firmware, or combination thereof for performing inverse transform and inverse quantization functions.

The reconstructed residual signal 132 is provided to a combiner 134. The combiner 134 also receives the feedback video signal 148. The combiner 134 then combines the reconstructed residual signal 132 and the feedback video signal 148 to produce a combined signal 136. The combiner 134 represents any hardware, software, firmware, or combination thereof for combining signals, such as an adder.

The combined signal 136 is provided to a deblocking filter 138. The deblocking filter 138 reduces blocking artifacts in images being decompressed, such as blocking artifacts located along the boundaries of different 16×16 macroblocks. This produces filtered video information 140. The deblocking filter 138 represents any hardware, software, firmware, or combination thereof for reducing blocking artifacts.

The filtered video information 140 is provided to a motion estimator 142 and a motion compensator 144. The motion estimator 142 also receives the original video information signal 116 and the feedback video signal 148. The motion estimator 142 uses the received information to identify motion within video images being compressed. For example, the motion estimator 142 could implement field-based or frame-based motion estimation to identify motion. The motion estimator 142 then outputs motion vectors 146, which represent the identified motion in the images. The motion vectors 146 are provided to the entropy encoder 126 for coding as part of the compressed video information 128 and to the motion compensator 144. The motion estimator 142 includes any hardware, software, firmware, or combination thereof for estimating motion in video images.

The motion compensator 144 receives the filtered video information 140 and the motion vectors 146. The motion compensator 144 uses the motion vectors 146 to alter the filtered video information 140 and re-introduce motion into the filtered video information 140. This produces the feedback video signal 148, which may or may not exactly match the original video information signal 116. The motion compensator 144 includes any hardware, software, firmware, or combination thereof for altering video information to introduce motion into video images.

In the illustrated example, an intra prediction unit 150 is used to process the video information when an intra prediction mode is used. The intra prediction mode is defined in the H.264 standard and analyzes 16×16 macroblocks in 4×4 blocks or partitions. In some embodiments, when intra prediction mode is used, the transform/quantize unit 122 implements the intra prediction mechanism on the 4×4 partitions. The intra prediction unit 150 implements a reverse of this process and generates the feedback video signal 148 when the video encoder 102 operates in the intra prediction mode.

The video decoder 104 could include many similar components as the video encoder 102 shown in FIG. 1. For example, the video decoder 104 could include the inverse transform/quantize unit 130, the combiner 134, the deblocking filter 138, the motion compensator 144, and the intra prediction unit 150. The video decoder 104 could also include an inverse entropy coder that implements the inverse of the coding function used by the entropy coder 126. The inverse entropy coder could receive the compressed video information 128, provide quantized DCT coefficients 124 to the inverse transform/quantize unit 130, and provide motion vectors 146 to the motion compensator 144. In this way, the video decoder 104 decompresses the video information 128 and recovers the video information signal 116 for presentation to a viewer.

In one aspect of operation, the video encoder 102 and the video decoder 104 implement subpixel interpolation. For example, the motion compensator 144 in the video encoder 102 and the video decoder 104 could implement subpixel motion compensation, which uses subpixel interpolation. Subpixel interpolation is typically computationally complex and computationally intensive. As described in more detail below, the video encoder 102 and/or the video decoder 104 includes one or more subpixel interpolation units and a memory arrangement that help to reduce the complexity of the subpixel interpolation and increase the speed of the subpixel interpolation.

In particular embodiments, the video encoder 102 and the video decoder 104 implement the H.264 compression scheme. The H.264 compression scheme supports several advanced video coding techniques, such as directional spatial prediction, multi-frame references, weighted prediction, deblocking filtering, variable block size, and quarter-sample accurate motion compensations. The H.264 compression scheme also supports a small, block-based, integer, and hierarchical transform, as well as CABAC and CAVLC coding.

The H.264 standard uses a tree-structured motion compensation method. This method supports variable motion compensation block or partition sizes that range from 4×4 to 16×16. For luminance samples, each 16×16 macroblock is formed from one or more 16×16, 16×8, 8×16, or 8×8 blocks. Each 8×8 block can be further partitioned into 8×4, 4×8, or 4×4 blocks. This provides more flexibility in the selection of motion compensation blocks and allows a large number of variable block size combinations to be used to match the shape of different objects in a video image.

Each block or partition in an inter-coded macroblock is described by a motion vector 146. The motion vector 146 of a partition in a current frame is predicted from an area of the same size in a reference frame. The offset between two motion vectors 146 is encoded and transmitted with the choice of partition. In the H.264 standard, the offset between two motion vectors 146 has a quarter-pixel resolution. This resolution allows a motion vector 146 to be calculated with better precision, increasing coding efficiency.

Although FIG. 1 illustrates one example of a video system 100, various changes may be made to FIG. 1. For example, FIG. 1 illustrates that compressed video information may be supplied to a video decoder 104 over a network 108, using an optical disc 110, or on a hard disk drive 112. The video encoder 102 could place the compressed video information on any other suitable storage medium or otherwise communicate the information to the video decoder 104 in any suitable manner. Also, FIG. 1 illustrates one example embodiment of the video encoder 102. Other embodiments of the video encoder 102 may be used. In addition, the video encoder 102 and the video decoder 104 could be combined into a single device or apparatus.

Figure 2:
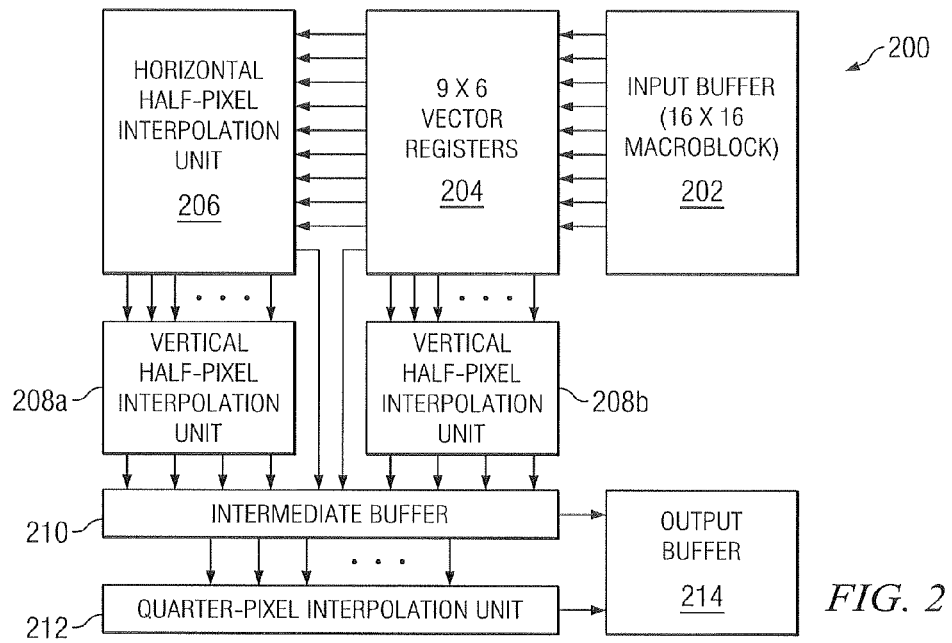
FIG. 2 illustrates an example subpixel interpolator according to one embodiment of this disclosure.

FIG. 2 illustrates an example subpixel interpolator 200 according to one embodiment of this disclosure. The subpixel interpolator 200 shown in FIG. 2 is for illustration only. Other embodiments of the subpixel interpolator 200 may be used without departing from the scope of this disclosure. Also, for ease of explanation, the subpixel interpolator 200 of FIG. 2 is described as operating within the system 100 of FIG. 1. The subpixel interpolator 200 could be used in any other system or device.

The subpixel interpolator 200 supports subpixel interpolation and therefore subpixel motion compensation within the video encoder 102 and/or the video decoder 104 of FIG. 1. The subpixel interpolator 200 may be used, for example, within the motion compensator 144 in the video encoder 102 or in the video decoder 104 of FIG. 1.

In this example, the subpixel interpolator 200 includes an input buffer 202 that receives and stores video information to be processed. For example, the input buffer 202 could receive a 16×16 macroblock from the de-blocking filter 138 of FIG. 1. The 16×16 macroblock contains data values representing a 16×16 block of pixels in an image. The original image pixels may be referred to as "full" pixels (as opposed to "fractional" pixels such as half-pixels and quarter-pixels). The size of the input buffer 202 shown in FIG. 2 is for illustration only. The input buffer 202 could store any other suitable amount of information, such as multiple 16×16 macroblocks or other blocks of data. The input buffer 202 represents any suitable storage device or devices.

A subset or portion of the data stored in the input buffer 202 is transferred to a set of vector registers 204. The vector registers 204 store a subset of the full pixel values from the macroblock stored in the input buffer 202. For example, the vector registers 204 could represent nine sets of six registers, where each set stores six full pixel values from a single row of the macroblock in the input buffer 202. In this way, the vector registers 204 may contain fifty-four full pixel values to be used during the subpixel interpolation process. The vector registers 204 represent any suitable storage device or devices.

Figure 3:
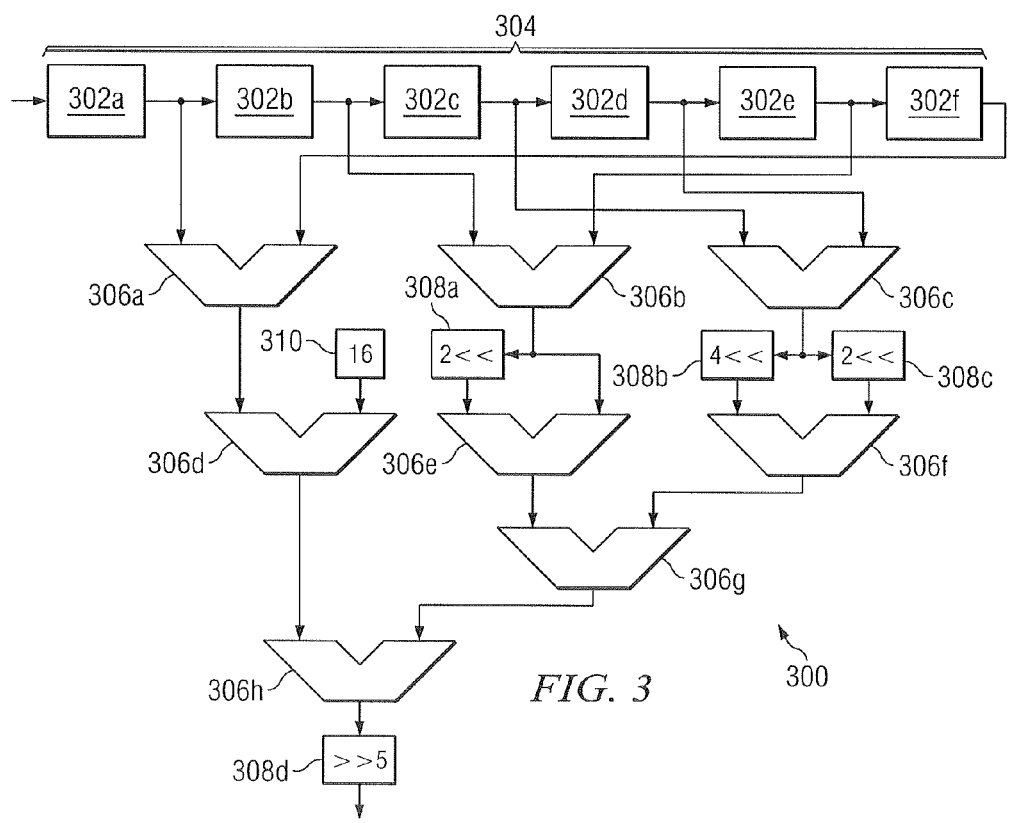
FIG. 3 illustrates an example horizontal half-pixel interpolator according to one embodiment of this disclosure.

The full pixel values stored in the vector registers 204 are provided to a horizontal half-pixel interpolation unit 206. The horizontal half-pixel interpolation unit 206 uses the full pixel values to interpolate the values of half-pixels, which are located horizontally between pairs of full pixels in an image. In some embodiments, the horizontal half-pixel interpolation unit 206 interpolates half-pixel values for multiple rows of the input macroblock in parallel, which helps to reduce the time needed to generate the half-pixel values. The horizontal half-pixel interpolation unit 206 includes any hardware, software, firmware, or combination thereof for interpolating half-pixel values in the horizontal direction. One example of a portion of the horizontal half-pixel interpolation unit 206 is shown in FIG. 3, which is described below.

Figure 4A:
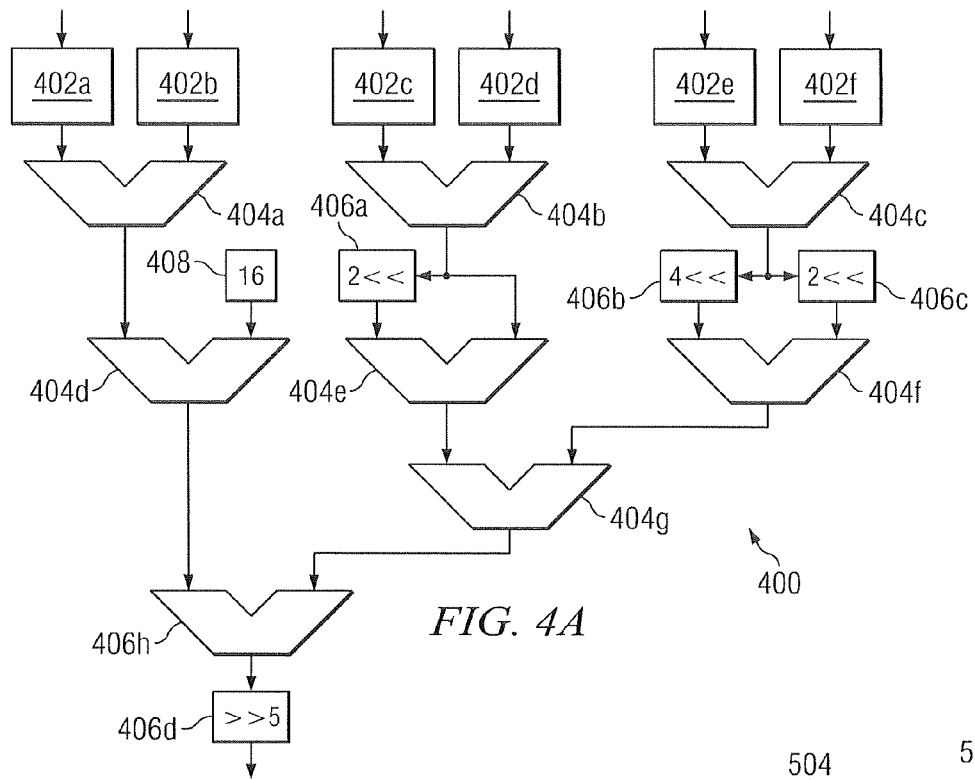
FIGS. 4A and 4B illustrate an example vertical half-pixel interpolator and an arrangement of vertical half-pixel interpolators according to one embodiment of this disclosure.
Figure 4B:
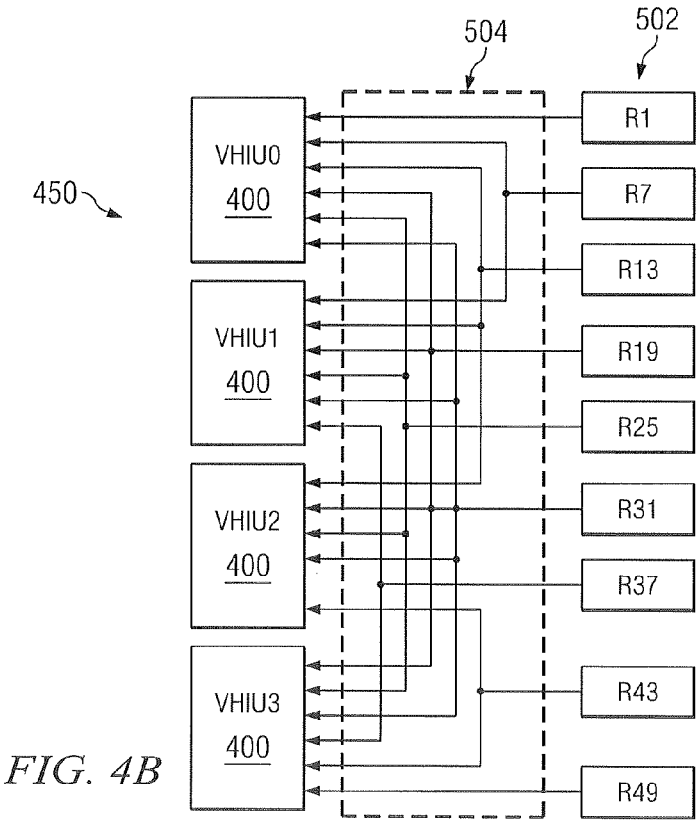

The horizontal half-pixel interpolation unit 206 provides the identified half-pixel values to a vertical half-pixel interpolation unit 208a. The vector registers 204 provide full pixel values to a vertical half-pixel interpolation unit 208b. The vertical half-pixel interpolation units 208a-208b use these pixel values to interpolate values of half-pixels located vertically between pairs of full pixels or between pairs of half-pixels (which were generated by the horizontal half-pixel interpolation unit 206). In some embodiments, the vertical half-pixel interpolation units 208a-208b interpolate half-pixel values for multiple columns of the input macroblock in parallel, which helps to reduce the time needed to identify the half-pixel values. Each of the vertical half-pixel interpolation units 208a-208b includes any hardware, software, firmware, or combination thereof for interpolating half-pixel values in the vertical direction. One example of a portion of the vertical half-pixel interpolation units 208a-208b is shown in FIGS. 4A and 4B, which are described below.

Half-pixel values from the horizontal half-pixel interpolation unit 206 and the vertical half-pixel interpolation units 208a-208b are stored in an intermediate buffer 210. Full pixel values from the vector registers 204 are also stored in the intermediate buffer 210. The intermediate buffer 210 represents any suitable storage device or devices capable of storing pixel data.

Figure 5:
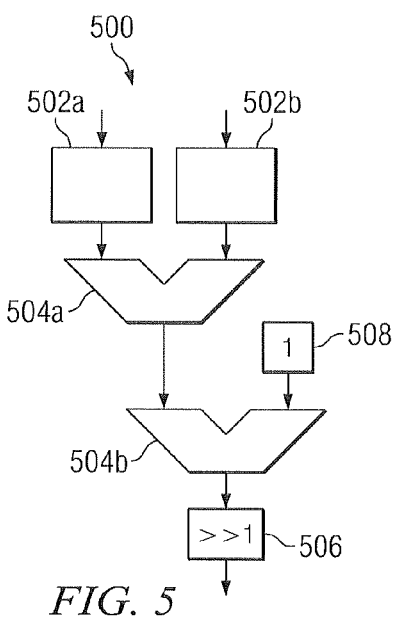
FIG. 5 illustrates an example quarter-pixel interpolator according to one embodiment of this disclosure.

The full pixel values and the half-pixel values stored in the intermediate buffer 210 are provided to a quarter-pixel interpolation unit 212. The quarter-pixel interpolation unit 212 uses the pixel values to interpolate values for quarter-pixels. The quarter-pixels are located horizontally, vertically, and diagonally between full pixels and half-pixels or between half-pixels. In some embodiments, the quarter-pixel interpolation unit 212 interpolates quarter-pixel values for multiple rows and columns of the input macroblock in parallel, which helps to reduce the time needed to identify the quarter-pixel values. The quarter-pixel interpolation unit 212 includes any hardware, software, firmware, or combination thereof for interpolating quarter-pixel values. One example of a portion of the quarter-pixel interpolation unit 212 is shown in FIG. 5, which is described below.

The full pixel values and half-pixel values stored in the intermediate buffer 210 are provided to an output buffer 214. The quarter-pixel values from the quarter-pixel interpolation unit 212 are also provided to the output buffer 214. The output buffer 214 stores the pixel data for retrieval by a component external to the subpixel interpolator 200. For example, the output buffer 214 may store the pixel data so that the motion compensator 144 may retrieve and analyze the pixel data. The output buffer 214 represents any suitable storage device or devices capable of storing pixel data.

The subpixel interpolator 200 shown in FIG. 2 helps to reduce the complexity and increase the speed of subpixel interpolations. For example, the vector registers 204 and buffers 202, 210, 214 are capable of storing groups of pixel values (full, half, and/or quarter). This helps to reduce the number of load and store operations needed during the interpolation process. Also, conventional devices implementing the H.264 standard usually perform a transpose operation after the horizontal interpolation to transfer data from rows to columns for vertical interpolation. The subpixel interpolator 200 uses the vector registers 204 to eliminate the need for the transpose operation, which also helps to reduce the time needed to perform the interpolation process. Further, data from the vector registers 204 is fed directly to the interpolation units 206, 208b, and data from the interpolation unit 206 is fed directly to the interpolation unit 208a. Furthermore, as explained in more detail below, the architecture of the subpixel interpolator 200 is designed in a pipelined fashion, allowing many subpixels to be generated per clock cycle after an initial latency.

In addition, both vertical and horizontal interpolation can be performed concurrently. In this embodiment, the subpixel interpolator 200 processes nine lines of pixels and generates four sets of outputs in parallel. This allows, for example, the subpixel interpolator 200 to generate a first set of half-pixels, a second set of half-pixels, and a third set of half-pixels. The subpixel interpolator 200 also generates a first set of quarter-pixels using the first set of half-pixels, where the first set of quarter-pixels are generated concurrently with the second set of half-pixels. The subpixel interpolator 200 further generates a second set of quarter-pixels using the second set of half-pixels, where the second set of quarter-pixels generated concurrently with the third set of half-pixels. In particular embodiments, the half-pixel and quarter-pixel interpolations are performed in-place, and seventeen half-pixels and forty-eight quarter-pixels are computed per cycle. This helps to increase the throughput of the subpixel interpolator 200. In this document, the term "concurrent" and its derivatives and the phrase "in parallel" refer to an overlap in the performance of two or more activities, whether the overlap is complete or partial.

In particular embodiments, each 16×16 input macroblock is processed by the subpixel interpolator 200, and the subpixel interpolator 200 outputs fifteen 16×16 blocks. The fifteen 16×16 output blocks contain full pixels, half-pixels, and quarter-pixels. Also, in particular embodiments, the subpixel interpolator 200 shown in FIG. 2 could be implemented as a co-processor for use with a processor performing video compression or decompression. The co-processor could represent a four-way very long instruction word (VLIW) processor capable of performing one load, one store, and two arithmetic operations per instruction. The instructions could represent single instruction multiple data (SIMD) instructions.

Although FIG. 2 illustrates one example of a subpixel interpolator 200, various changes may be made to FIG. 2. For example, the size of the input macroblock (16×16) and the size of the set of vector registers 204 (9×6) are for illustration only.

FIG. 3 illustrates an example horizontal half-pixel interpolator 300 according to one embodiment of this disclosure. The embodiment of the horizontal half-pixel interpolator 300 shown in FIG. 3 is for illustration only. Other embodiments of the horizontal half-pixel interpolator 300 could be used without departing from the scope of this disclosure. Also, for ease of explanation, the horizontal half-pixel interpolator 300 is described as forming part of the horizontal half-pixel interpolation unit 206 in the subpixel interpolator 200 of FIG. 2. The horizontal half-pixel interpolator 300 could be used in any other system or device.

In this example, the horizontal half-pixel interpolator 300 includes six input registers 302a-302f. The input registers 302a-302f are capable of storing six different pixel values, such as full pixel values received from the vector registers 204. The input registers 302a-302f form a stage-shift register 304, where the full pixel values are shifted from one register to another. The first input register 302a receives the full pixel value from one of the vector registers 204. Each remaining input register 302b-302f receives a full pixel value from a previous input register 302a-302e, respectively. The input registers 302a-302f include any structure capable of storing pixel values.

The horizontal half-pixel interpolator 300 also includes eight adders 306a-306h and four shifters 308a-308d. Each of the adders 306a-306h includes any hardware, software, firmware, or combination thereof for adding two or more input values. Each of the shifters 308a-308d includes any hardware, software, firmware, or combination thereof for shifting values by one or more bit positions in one or more directions.

Each of the adders 306a-306c receives and sums two full pixel values from two of the input registers 302a-302f. The adder 306d receives and sums the output of the adder 306a and a constant value 310. The adder 306e receives and sums the output of the adder 306b and the output of the shifter 308a. The shifter 308a shifts the output of the adder 306b to the left by two bit positions (equivalent to multiplying the output of the adder 306b by 4). In effect, the adder 306e outputs a value equal to five times the output of the adder 306b.

The adder 306f receives and sums the outputs of the shifters 308b-308c. The shifters 308b-308c shift the output of the adder 306c to the left by four bit positions (equivalent to multiplying the output of the adder 306c by 16) and two bit positions, respectively. In effect, the adder 306f outputs a value equal to twenty times the output of the adder 306c.

The adder 306g receives the outputs of the adders 306e and 306f. The adder 306g subtracts the output of the adder 306e from the output of the adder 306f. The adder 306h receives and sums the outputs of the adders 306d and 306g. The shifter 308d shifts the output of the adder 306h to the right by five bit positions (equivalent to dividing the output of the adder 306h by 32). The output of the shifter 308d represents one half-pixel value computed using the six full pixel values stored in the input registers 302a-302f.

In the illustrated embodiment, the adders 306a-306h and the shifters 308a-308d form a four-stage pipelined architecture. The first stage is represented by the adders 306a-306c. The second stage is represented by the adders 306d-306f and shifters 308a-308c. The third stage is represented by the adder 306g, and the fourth stage is represented by the adder 306h and the shifter 308d. Because there are four stages, the horizontal half-pixel interpolator 300 has a latency of three cycles, and after that one half-pixel is generated per clock cycle. This embodiment of the horizontal half-pixel interpolator 300 does not require the use of multipliers, which may slow the operation of the horizontal half-pixel interpolator 300.

In the embodiment of the subpixel interpolator 200 shown in FIG. 2, nine horizontal half-pixel interpolators 300 could be used in the horizontal half-pixel interpolation unit 206. In this embodiment, the nine horizontal half-pixel interpolators 300 receive full pixel values from nine different rows in the vector registers 204. The nine horizontal half-pixel interpolators 300 then calculate nine different horizontal half-pixels concurrently. Other embodiments of the horizontal half-pixel interpolation unit 206 using other numbers of horizontal half-pixel interpolators 300 may be used.

Although FIG. 3 illustrates one example of a horizontal half-pixel interpolator 300, various changes may be made to FIG. 3. For example, other structures that provide the same functionality as the horizontal half-pixel interpolator 300 shown in FIG. 3 may be used.

FIGS. 4A and 4B illustrate an example vertical half-pixel interpolator 400 and an arrangement 450 of vertical half-pixel interpolators 400 according to one embodiment of this disclosure. The embodiment of the vertical half-pixel interpolator 400 shown in FIG. 4A and the arrangement 450 shown in FIG. 4B are for illustration only. Other embodiments of the vertical half-pixel interpolator 400 and other arrangements 450 could be used without departing from the scope of this disclosure. Also, for ease of explanation, the vertical half-pixel interpolator 400 and arrangement 450 are described as forming part of the vertical half-pixel interpolation units 208a-208b in the subpixel interpolator 200 of FIG. 2. The vertical half-pixel interpolator 400 and arrangement 450 could be used in any other system or device.

In FIG. 4A, the vertical half-pixel interpolator 400 includes six input registers 402a-402f. The input registers 402a-402f are capable of storing six different pixel values used to generate half-pixel values. For example, if the vertical half-pixel interpolator 400 is used in the vertical half-pixel interpolation unit 208a of FIG. 2, the pixel values stored in the input registers 402a-402f represent half-pixel values generated by the horizontal half-pixel interpolation unit 206. If the vertical half-pixel interpolator 400 is used in the vertical half-pixel interpolation unit 208b of FIG. 2, the pixel values stored in the input registers 402a-402f represent full pixel values from the vector registers 204. The input registers 402a-402f include any structure capable of storing pixel values.

The vertical half-pixel interpolator 400 also includes eight adders 404a-404h and four shifters 406a-406d. Each of the adders 404a-404h includes any hardware, software, firmware, or combination thereof for adding two or more input values. Each of the shifters 406a-406d includes any hardware, software, firmware, or combination thereof for shifting values by one or more bit positions in one or more directions.

Each of the adders 404a-404c receives and sums pixel values from two of the input registers 402a-402f. The adder 404d receives and sums the output of the adder 404a and a constant value 408. The adder 404e receives and sums the output of the adder 404b and the output of the shifter 406a, which shifts the output of the adder 404b to the left by two bit positions. The adder 404f receives and sums the outputs of the shifters 406b-406c, which shift the output of the adder 404c to the left by four bit positions and two bit positions, respectively. The adder 404g receives and subtracts the output of the adder 404e from the output of the adder 404f. The adder 404h receives and sums the outputs of the adders 404d and 404g. The shifter 406d shifts the output of the adder 404h to the right by five bit positions. The output of the shifter 406d represents one half-pixel value computed using the six pixel values (full pixel values or half-pixel values) stored in the input registers 402a-402f.

In the illustrated embodiment, the adders 404a-404h and the shifters 406a-406d form a four-stage pipelined architecture. The vertical half-pixel interpolator 400 has a latency of three cycles, and after that one half-pixel is generated per clock cycle. This embodiment of the vertical half-pixel interpolator 400 also does not require the use of multipliers.

In the embodiment of the subpixel interpolator 200 shown in FIG. 2, four vertical half-pixel interpolators 400 could be used in each of the vertical half-pixel interpolation units 208a-208b for a total of eight vertical half-pixel interpolators 400. This allows the vertical half-pixel interpolation units 208a-208b to calculate eight different vertical half-pixels concurrently. Other embodiments of the vertical half-pixel interpolation units 208a-208b using other numbers of vertical half-pixel interpolators 400 may be used.

In FIG. 4B, an arrangement 450 is illustrated, which may be used in the vertical half-pixel interpolation unit 208b. As explained below, a similar arrangement may be used in the vertical half-pixel interpolation unit 208a.

In this example, the arrangement 450 includes four of the vertical half-pixel interpolation units 400(VHIU0-VHIU3). Each may have the same or similar structure as shown in FIG. 4A. The arrangement 450 also includes a column 502 of vector registers 204, which in the example above in FIG. 2 includes nine vector registers. The arrangement 450 further includes a permutation unit 504, which routes data from the column 502 of vector registers 204 to the vertical half-pixel interpolation units 400.

In the example shown in FIG. 2, the vector registers 204 include six rows and nine columns of registers. Denote the fifty-four vector registers 204 as R0 through R53. In this example, the first row includes R0-R5, the second row includes R6-R11, and the last row includes R48-R53. Data from the vector registers 204 is fed to the horizontal half-pixel interpolation unit 206 by row, and data from the vector registers 204 is fed to the vertical half-pixel interpolation unit 208b by column.

To enable providing data to the vertical half-pixel interpolators 400 by column, the arrangement 450 uses the permutation unit 504. The permutation unit 504 represents a Single Instruction Multiple Data (SIMD) permutation unit embedded in the vertical half-pixel interpolation unit 208b. The permutation unit 504 selects the appropriate inputs for each of the four vertical half-pixel interpolators 400. In particular, the first and last register values R1 and R49 are each provided to a single vertical half-pixel interpolator. The second and eighth register values R7 and R43 are each provided to two vertical half-pixel interpolators. The third and seventh register values R13 and R37 are each provided to three vertical half-pixel interpolators. The fourth, fifth, and sixth register values R19, R25, and R31 are each provided to four vertical half-pixel interpolators. A single SIMD instruction is used to activate vertical half-pixel interpolation unit 208b and provide data from the column 502 of registers to the vertical half-pixel interpolators 400. Four half-pixels are then computed in parallel.

The column 502 of vector registers shown in FIG. 4B represents the second column in the set of vector registers 204. During a subsequent clock cycle, the permutation unit 504 could retrieve and provide data from the third column in the set of vector registers 204. During another subsequent clock cycles, the permutation unit 504 could retrieve and provide data from other columns in the set of vector registers 204. In this way, the vertical half-pixel interpolation unit 208b avoids the use of transpose operations.

As noted above, a similar arrangement could be used in the vertical half-pixel interpolation unit 208a. As shown in FIG. 4B, the data provided to the vertical half-pixel interpolation unit 208b comes from the vector registers 204. As shown in FIG. 2, the data provided to the vertical half-pixel interpolation unit 208a comes from the horizontal half-pixel interpolation unit 206. As a result, the same or similar permutation unit 504 may be used in the vertical half-pixel interpolation unit 208a with a different input source of data.

Although FIGS. 4A and 4B illustrate one example of a vertical half-pixel interpolator 400 and an arrangement 450 of vertical half-pixel interpolators 400, various changes may be made to FIGS. 4A and 4B. For example, other structures that provide the same functionality as the vertical half-pixel interpolator 400 shown in FIG. 4A may be used. Also, other arrangements that route pixel data to the vertical half-pixel interpolators 400 may be used.

FIG. 5 illustrates an example quarter-pixel interpolator 500 according to one embodiment of this disclosure. The embodiment of the quarter-pixel interpolator 500 shown in FIG. 5 is for illustration only. Other embodiments of the quarter-pixel interpolator 500 could be used without departing from the scope of this disclosure. Also, for ease of explanation, the quarter-pixel interpolator 500 is described as forming part of the quarter-pixel interpolation unit 212 in the subpixel interpolator 200 of FIG. 2. The quarter-pixel interpolator 500 could be used in any other system or device.

In this example, the quarter-pixel interpolator 500 includes two input registers 502a-502b. The input registers 502a-502b are capable of storing two different pixel values. The pixel values may represent a full pixel value and a half-pixel value or two half-pixel values. The input registers 502a-502b include any structure capable of storing pixel values.

The quarter-pixel interpolator 500 also includes two adders 504a-504b and a shifter 506. Each of the adders 504a-504b includes any hardware, software, firmware, or combination thereof for adding two or more input values. The shifter 506 includes any hardware, software, firmware, or combination thereof for shifting values by one or more bit positions in one or more directions.

The adder 504a receives and sums the pixel values from the input registers 502a-502b. The adder 504d receives and sums the output of the adder 504a and a constant value 508. The shifter 506 shifts the output of the adder 504b to the right by one bit position (equivalent to dividing the output of the adder 504b by 2). The output of the shifter 506 represents one quarter-pixel value computed using the two pixel values stored in the input registers 502a-502b.

In the illustrated embodiment, the adders 504a-504b and the shifter 506 form a two-stage pipelined architecture. The quarter-pixel interpolator 500 has a latency of one cycle, and after that one quarter-pixel is generated per clock cycle. This embodiment of the quarter-pixel interpolator 500 does not require the use of multipliers.

In the embodiment of the subpixel interpolator 200 shown in FIG. 2, forty-eight quarter-pixel interpolators 500 could be used in the quarter-pixel interpolation unit 212. This allows the quarter-pixel interpolation unit 212 to calculate forty-eight different quarter-pixels concurrently. Other embodiments of the quarter-pixel interpolation unit 212 using other numbers of quarter-pixel interpolators 500 may be used.

Collectively, the subpixel interpolator 200 generates up to nine horizontal half-pixels, eight vertical half-pixels, and forty-eight quarter-pixels each clock cycle. If a 16×16 macroblock is received as input, the output of the subpixel interpolator 200 could be organized as a 64×64 block. Denote the top-left pixel of the 64×64 output block as $o_{0,0}$ and the bottom-right pixel as $o_{63,63}$. Table 1 illustrates the subpixel interpolation process performed by the subpixel interpolator 200. In this table, the output values $o_{v,h}$ are indexed first by their vertical index v and then by their horizontal index h.

Figure 6:
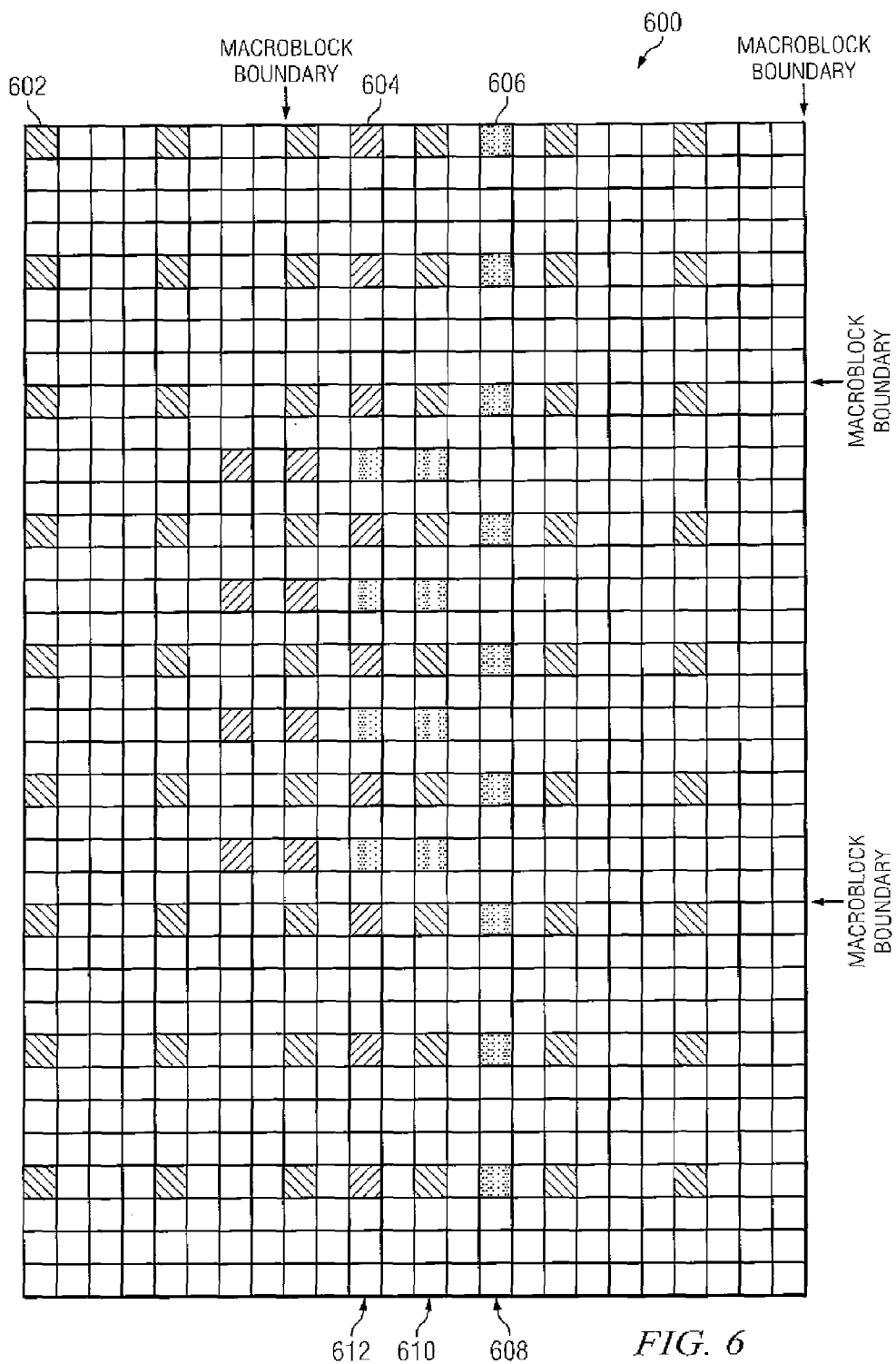
FIG. 6 illustrates an example half-pixel interpolation involving an image macroblock according to one embodiment of this disclosure.

FIG. 6 illustrates an example half-pixel interpolation 600 involving an image macroblock according to one embodiment of this disclosure. In particular, FIG. 6 illustrates an example half-pixel interpolation 600 performed by the horizontal half-pixel interpolation unit 206 and the vertical half-pixel interpolation units 208a-208b in the subpixel interpolator 200 of FIG. 2, where each interpolation makes use of six full pixels (e.g., three on either side of a subject pixel for horizontal interpolation and three above and three below a subject pixel for vertical interpolation). The subpixel interpolator 200 of FIG. 2 may operate in any other suitable manner without departing from the scope of this disclosure.

The vector registers 204 in the subpixel interpolator 200 store nine rows of six full pixel values (every fourth pixel in FIG. 6). In this example, full pixels are denoted as pixels with left-to-right diagonal hatching, such as pixel 602, in FIG. 6. Half-pixels interpolated by the subpixel interpolator 200 during a first iteration/clock cycle are denoted as pixels with

TABLE 1

| Cycle | Horizontal Half-Pixels | Vertical Half-Pixels | Quarter-Pixels |
|---|---|---|---|
| 1 | | | |
| 2 | | | |
| 3 | | | |
| 4 | $o_{-8,2}, o_{-4,2}, o_{0,2}, \ldots, o_{24,2}$ | $o_{2,-2}, \ldots, o_{14,-2}; o_{2,0}, \ldots, o_{14,0}$ | |
| 5 | $o_{-8,6}, o_{-4,6}, o_{0,6}, \ldots, o_{24,6}$ | $o_{2,2}, \ldots, o_{14,2}; o_{2,4}, \ldots, o_{14,4}$ | |
| 6 | $o_{-8,10}, o_{-4,10}, o_{0,10}, \ldots, o_{24,10}$ | $o_{2,6}, \ldots, o_{14,6}; o_{2,8}, \ldots, o_{14,8}$ | $o_{0,1}-o_{15,1}; o_{0,3}-o_{15,3}; o_{1,0}-o_{15,0}; o_{1,2}-o_{15,2}$ |
| 7 | $o_{-8,14}, o_{-4,14}, o_{0,14}, \ldots, o_{24,14}$ | $o_{2,10}, \ldots, o_{14,10}; o_{2,12}, \ldots, o_{14,12}$ | $o_{0,5}-o_{15,5}; o_{0,7}-o_{15,7}; o_{1,4}-o_{15,4}; o_{1,6}-o_{15,6}$ |
| 8 | $o_{-8,18}, o_{-4,18}, o_{0,18}, \ldots, o_{24,18}$ | $o_{2,14}, \ldots, o_{14,14}; o_{2,16}, \ldots, o_{14,16}$ | $o_{0,9}-o_{15,9}; o_{0,11}-o_{15,11}; o_{1,8}-o_{15,8}; o_{1,10}-o_{15,10}$ |
| 9 | $o_{-8,22}, o_{-4,22}, o_{0,22}, \ldots, o_{24,22}$ | $o_{2,18}, \ldots, o_{14,18}; o_{2,20}, \ldots, o_{14,20}$ | $o_{0,13}-o_{15,13}; o_{0,15}-o_{15,15}; o_{1,12}-o_{15,12}; o_{1,14}-o_{15,14}$ |
| 10 | $o_{-8,26}, o_{-4,26}, o_{0,26}, \ldots, o_{24,26}$ | $o_{2,22}, \ldots, o_{14,22}; o_{2,24}, \ldots, o_{14,24}$ | $o_{0,17}-o_{15,17}; o_{0,19}-o_{15,19}; o_{1,16}-o_{15,16}; o_{1,18}-o_{15,18}$ |
| 11 | $o_{-8,30}, o_{-4,30}, o_{0,30}, \ldots, o_{24,30}$ | $o_{2,26}, \ldots, o_{14,26}; o_{2,28}, \ldots, o_{14,28}$ | $o_{0,21}-o_{15,21}; o_{0,23}-o_{15,23}; o_{1,20}-o_{15,20}; o_{1,22}-o_{15,22}$ |
| 12 | $o_{-8,34}, o_{-4,34}, o_{0,34}, \ldots, o_{24,34}$ | $o_{2,30}, \ldots, o_{14,30}; o_{2,32}, \ldots, o_{14,32}$ | $o_{0,25}-o_{15,25}; o_{0,27}-o_{15,27}; o_{1,24}-o_{15,24}; o_{1,26}-o_{15,26}$ |
| 13 | $o_{-8,38}, o_{-4,38}, o_{0,38}, \ldots, o_{24,38}$ | $o_{2,34}, \ldots, o_{14,34}; o_{2,36}, \ldots, o_{14,36}$ | $o_{0,29}-o_{15,29}; o_{0,31}-o_{15,31}; o_{1,28}-o_{15,28}; o_{1,30}-o_{15,30}$ |
| 14 | $o_{-8,42}, o_{-4,42}, o_{0,42}, \ldots, o_{24,42}$ | $o_{2,38}, \ldots, o_{14,38}; o_{2,40}, \ldots, o_{14,40}$ | $o_{0,33}-o_{15,33}; o_{0,35}-o_{15,35}; o_{1,32}-o_{15,32}; o_{1,34}-o_{15,34}$ |
| 15 | $o_{-8,46}, o_{-4,46}, o_{0,46}, \ldots, o_{24,46}$ | $o_{2,42}, \ldots, o_{14,42}; o_{2,44}, \ldots, o_{14,44}$ | $o_{0,37}-o_{15,37}; o_{0,39}-o_{15,39}; o_{1,36}-o_{15,36}; o_{1,38}-o_{15,38}$ |
| 16 | $o_{-8,50}, o_{-4,50}, o_{0,50}, \ldots, o_{24,50}$ | $o_{2,46}, \ldots, o_{14,46}; o_{2,48}, \ldots, o_{14,48}$ | $o_{0,41}-o_{15,41}; o_{0,43}-o_{15,43}; o_{1,40}-o_{15,40}; o_{1,42}-o_{15,42}$ |
| 17 | $o_{-8,54}, o_{-4,54}, o_{0,54}, \ldots, o_{24,54}$ | $o_{2,50}, \ldots, o_{14,50}; o_{2,52}, \ldots, o_{14,52}$ | $o_{0,45}-o_{15,45}; o_{0,47}-o_{15,47}; o_{1,44}-o_{15,44}; o_{1,46}-o_{15,46}$ |
| 18 | $o_{-8,58}, o_{-4,58}, o_{0,58}, \ldots, o_{24,58}$ | $o_{2,54}, \ldots, o_{14,54}; o_{2,56}, \ldots, o_{14,56}$ | $o_{0,49}-o_{15,49}; o_{0,51}-o_{15,51}; o_{1,48}-o_{15,48}; o_{1,50}-o_{15,50}$ |
| 19 | $o_{-8,62}, o_{-4,62}, o_{0,62}, \ldots, o_{24,62}$ | $o_{2,58}, \ldots, o_{14,58}; o_{2,60}, \ldots, o_{14,60}$ | $o_{0,53}-o_{15,53}; o_{0,55}-o_{15,55}; o_{1,52}-o_{15,52}; o_{1,54}-o_{15,54}$ |
| 20 | ... | $o_{2,62}, \ldots, o_{14,62}; o_{2,64}, \ldots, o_{14,64}$ | $o_{0,57}-o_{15,57}; o_{0,59}-o_{15,59}; o_{1,56}-o_{15,56}; o_{1,58}-o_{15,58}$ |
| 21 | ... | ... | $o_{0,61}-o_{15,61}; o_{0,63}-o_{15,63}; o_{1,60}-o_{15,60}; o_{1,62}-o_{15,62}$ |
| 22 | ... | ... | ... |
| 23 | ... | ... | ... |
| ... | ... | ... | ... |
| ... | ... | ... | ... |
| 82 | $o_{40,62}, o_{44,62}, o_{48,62}, \ldots, o_{72,62}$ | $o_{2,58}, \ldots, o_{14,58}; o_{2,60}, \ldots, o_{14,60}$ | $o_{48,53}-o_{63,53}; o_{48,55}-o_{63,55}; o_{49,52}-o_{63,52}; o_{49,54}-o_{63,54}$ |
| 83 | | $o_{2,62}, \ldots, o_{14,62}; o_{2,64}, \ldots, o_{14,64}$ | $o_{48,57}-o_{63,57}; o_{48,59}-o_{63,59}; o_{49,56}-o_{63,56}; o_{49,58}-o_{63,58}$ |
| 84 | | | $o_{48,61}-o_{63,61}; o_{48,63}-o_{63,63}; o_{49,60}-o_{63,60}; o_{49,62}-o_{63,62}$ |

As shown in Table 1 and discussed above, there is a three-cycle latency before the first half-pixel values are generated. After that, nine horizontal half-pixels and eight vertical half-pixels may be produced per clock cycle, and it will take fifteen cycles to process the remaining pixels in each line of the 16×16 macroblock. Also, two extra clock cycles are needed to complete the quarter-pixel calculations. As a result, computation of the quarter-pixels for each line of the 16×16 macroblock will take twenty-one clock cycles. Because four lines of the 16×16 macroblock may be processed concurrently, computation of all fractional pixels for a 16×16 macroblock will take eighty-four clock cycles.

Although FIG. 5 illustrates one example of a quarter-pixel interpolator 500, various changes may be made to FIG. 5. For example, other structures that provide the same functionality as the quarter-pixel interpolator 500 shown in FIG. 5 may be used.

right-to-left diagonal hatching, such as pixel 604, in FIG. 6. Half-pixels interpolated by the subpixel interpolator 200 during a second iteration/clock cycle are denoted as pixels with stipling, such as pixel 606, in FIG. 6.

Take the second iteration as an example. Each horizontal half-pixel interpolator 300 in the interpolation unit 206 receives the values of six full pixels 602 in one of the rows in FIG. 6. Using those full pixels 602, the nine horizontal half-pixel interpolators 300 generate the half-pixels 606 shown in column 608 of FIG. 6.

Each vertical half-pixel interpolator 400 in the interpolation unit 208b receives six of the nine full pixels 602 in column 610 of FIG. 6. Those vertical half-pixel interpolators 400 then generate the four half-pixels 606 shown in column 610 of FIG. 6. Also, each vertical half-pixel interpolator 400 in the interpolation unit 208a receives six of the nine half-pixels 604 in column 612 of FIG. 6. The half-pixels 604 in column 612 were generated by the horizontal half-pixel interpolation unit 206 during the first iteration. These vertical half-pixel interpolators 400 then generate the four half-pixels 606 shown in column 612 of FIG. 6.

In this way, the horizontal half-pixel interpolation unit 206 and the vertical half-pixel interpolation units 208a-208b may generate seventeen half-pixel values in parallel. This architecture helps to reduce the delay associated with the subpixel interpolation process and increase the throughput of the subpixel interpolator 200.

Although FIG. 6 illustrates one example of a half-pixel interpolation 600 involving an image macroblock, various changes may be made to FIG. 6. For example, the half-pixel interpolation could occur in any other suitable manner, such as when more or less half-pixels are generated per iteration.

Figure 7:
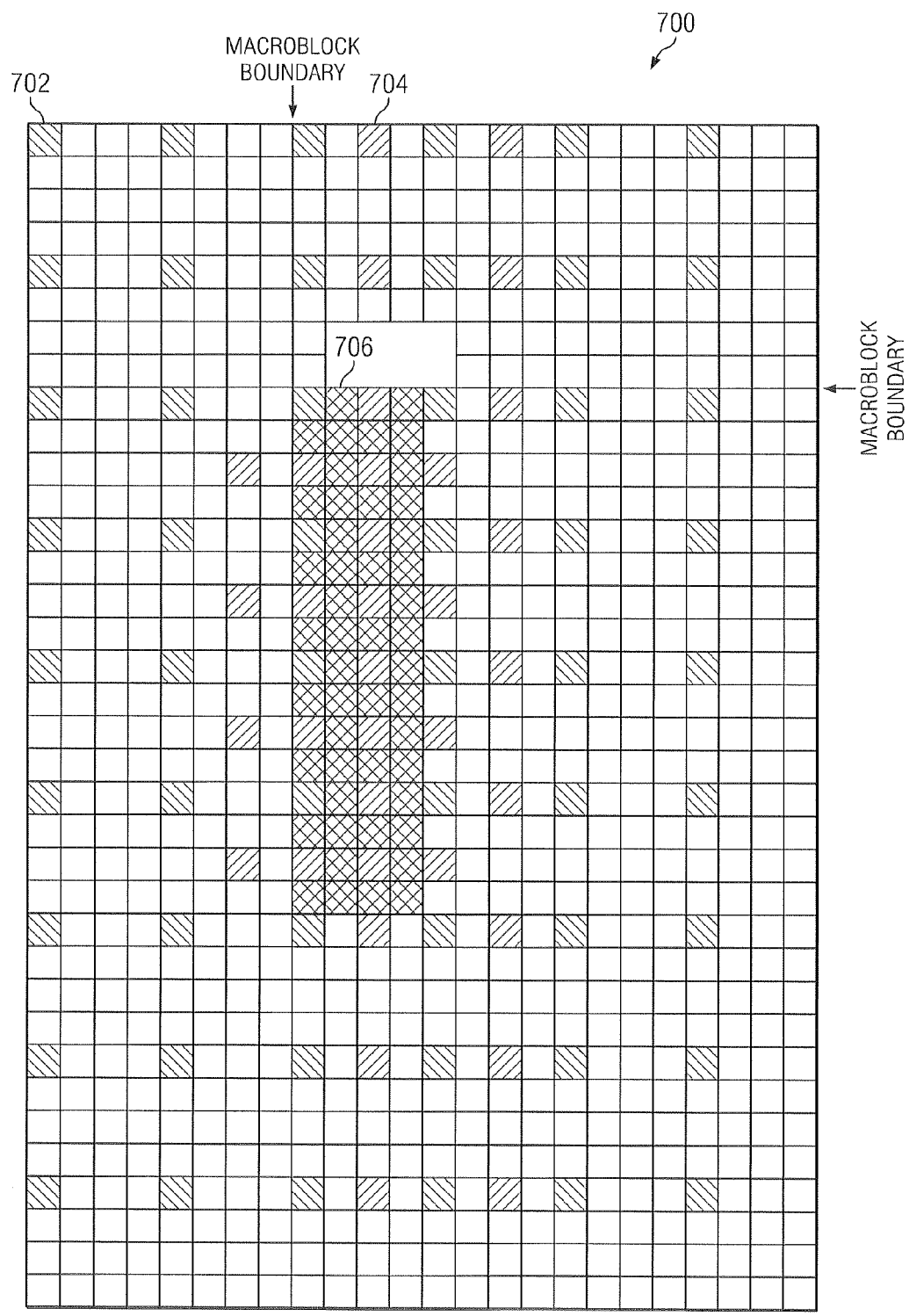
FIG. 7 illustrates an example quarter-pixel interpolation involving an image macroblock according to one embodiment of this disclosure.

FIG. 7 illustrates an example quarter-pixel interpolation 700 involving an image macroblock according to one embodiment of this disclosure. In particular, FIG. 7 illustrates an example quarter-pixel interpolation 700 performed by the quarter-pixel interpolation unit 212 in the subpixel interpolator 200 of FIG. 2. The subpixel interpolator 200 of FIG. 2 may operate in any other suitable manner without departing from the scope of this disclosure.

In this example, full pixels are again denoted as gray pixels, such as pixel 702, in FIG. 7. Half-pixels interpolated by the subpixel interpolator 200 (both vertical and horizontal) are denoted as hatched pixels, such as pixel 704, in FIG. 7. Quarter-pixels interpolated by the subpixel interpolator 200 are denoted as cross-hatched pixels, such as pixel 706, in FIG. 7.

As shown in FIG. 7, each quarter-pixel 706 is located horizontally, vertically, or diagonally between a full pixel 702 and a half-pixel 704 or between two half-pixels 704. Each quarter-pixel 706 is determined using those two surrounding pixel values.

The quarter-pixel interpolation unit 212 may calculate forty-eight different quarter-pixel values during each clock cycle/iteration of the quarter-pixel interpolation unit 212. This may be done in parallel with the half-pixel interpolation units 206, 208a-208b. For example, the half-pixel interpolation units 206, 208a-208b may generate seventeen half-pixels. The quarter-pixel interpolation unit 212 receives those half-pixels and generates forty-eight quarter pixels. As the quarter-pixel interpolation unit 212 is generating those quarter-pixels, the half-pixel interpolation units 206, 208a-208b may be generating another seventeen half-pixels, which are later received by the quarter-pixel interpolation unit 212. In this way, the interpolation units 206, 208a-208b, 212 may operate concurrently to quickly generate fractional pixels.

As shown in FIG. 7, the subpixel interpolator 200 calculates three half-pixels 704 and twelve quarter-pixels 706 for each full pixel 702 in an image. For 16×16 macroblocks, this means that the subpixel generator 200 outputs 3,840 (16*16*15) full and fractional pixels per macroblock. These half-pixels 704 and quarter-pixels 706 may be used to provide improved motion compensation when compressing/decompressing video information. Using the architecture shown in FIGS. 2-5, these half-pixels 704 and quarter-pixels 706 may be generated with less delay and lower computational overhead than conventional H.264 and other video encoders/decoders.

Although FIG. 7 illustrates one example of a quarter-pixel interpolation 700 involving an image macroblock, various changes may be made to FIG. 7. For example, the quarter-pixel interpolation could occur in any other suitable manner, such as when more or less quarter-pixels are generated per iteration.

Figure 8:
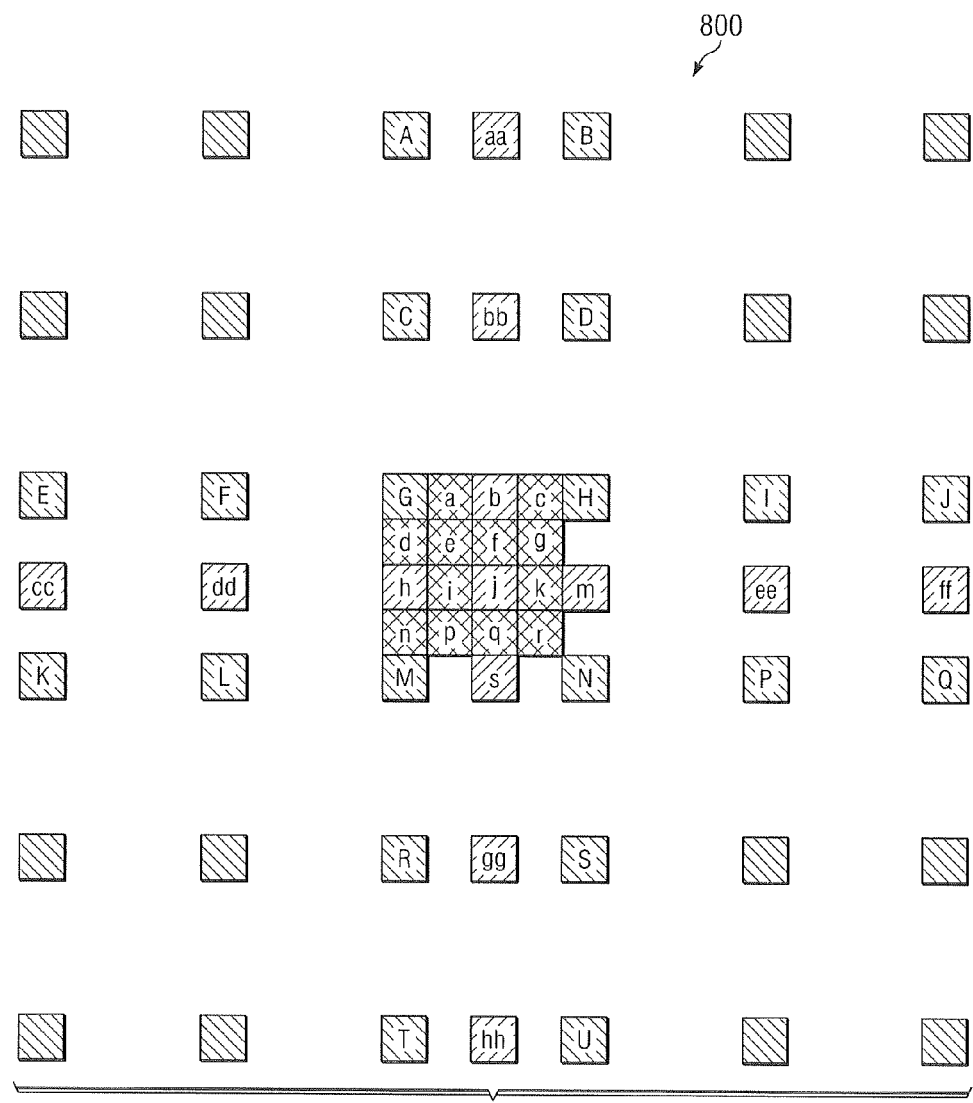
FIG. 8 illustrates additional details of an example half-pixel and quarter-pixel interpolation involving an image macroblock according to one embodiment of this disclosure.

FIG. 8 illustrates additional details of an example half-pixel and quarter-pixel interpolation 800 involving an image macroblock according to one embodiment of this disclosure. FIG. 8 uses the same shading to distinguish full pixels, half-pixels, and quarter-pixels as FIG. 7.

In FIG. 8, upper-case letters denote full pixels (such as luminance pixels), while lower case letters denote half-pixels and quarter-pixels. The half-pixels, such as pixels b and h, are calculated by horizontal half-pixel interpolators 300 and vertical half-pixel interpolators 400. In the embodiments shown in FIGS. 3 and 4, each of the interpolators 300, 400 acts as a six-tap finite impulse response (FIR) filter. In the H.264 standard, the coefficients of the six-tap FIR filter are (1, −5, 20, 20, −5, 1)/32. The horizontal half-pixel interpolators 300 calculate each half-pixel using six full pixel values in a row. The vertical half-pixel interpolators 400 calculate each half-pixel using six full pixel values or six half-pixel values in a column.

In this embodiment, the values of the half-pixels b and h can be represented using the formulas:

$$b = (E - 5F + 20G + 20H - 5I + J + 16)/32 \tag{1}$$

$$h = (A - 5C + 20G + 20M - 5R + T + 16)/32. \tag{2}$$

Each result may be rounded up to the nearest integer. Values for the half-pixels aa, bb, s, gg, and hh are calculated in the same way as b. Values for cc, dd, m, ee, and ff are calculated in the same way as h. The value for the half-pixel j can be calculated by applying the six-tap filter horizontally (using cc, dd, h, m, ee, and ff) or vertically (using aa, bb, b, s, gg, and hh), which is represented using the formulas:

$$j = (cc - 5dd + 20h + 20m - 5ee + ff + 16)/32 \tag{3}$$

$$j = (aa - 5bb + 20b + 20s - 5gg + hh + 16)/32. \tag{4}$$

Once the half-pixel values are available, the quarter-pixel interpolators 500 calculate the quarter-pixel values. The quarter-pixel values are calculated using linear interpolation, and the results are rounded up to the nearest integer. For example, values of the quarter-pixels a, d, and e can be represented using the formulas:

$$a = (G + b + 1)/2 \tag{5}$$

$$d = (G + h + 1)/2 \tag{6}$$

$$e = (b + h + 1)/2. \tag{7}$$

Values for the remaining quarter pixels may be calculated in a similar manner.

Although FIG. 8 illustrates additional details of one example of half-pixel and quarter-pixel interpolation involving an image macroblock, various changes may be made to FIG. 8. For example, more or less half-pixels and quarter-pixels could be generated and used in each iteration of the subpixel interpolator 200.

Figure 9:
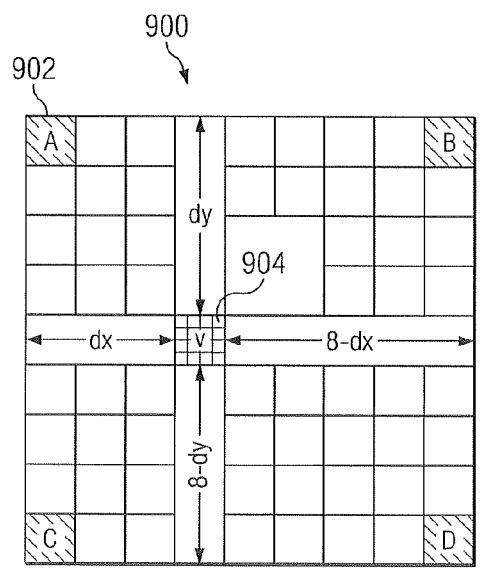
FIG. 9 illustrates an example eighth-pixel interpolation involving an image macroblock according to one embodiment of this disclosure.

FIG. 9 illustrates an example eighth-pixel interpolation 900 involving an image macroblock according to one embodiment of this disclosure. In some embodiments, the subpixel interpolator 200 of FIG. 2 may need to identify eighth-pixel values, such as when 4:2:0 sampling is used and quarter-pixel luminance values require eighth-pixel chrominance values.

In this example, the full pixels are again denoted as gray pixels, such as pixel 902, in FIG. 9. The eighth-pixels are denoted as cross-hatched pixels, such as pixel 904 in FIG. 9.

In this example, eighth-pixels 904 are calculated using linear interpolation involving the four surrounding full pixels 902. However, the eighth-pixels 904 could be calculated in any other suitable manner. For example, the eighth-pixels 904 could be calculated using neighboring half-pixels or quarter-pixels or a combination of full, half-, and/or quarter-pixels.

Although FIG. 9 illustrates an example eighth-pixel interpolation 900 involving an image macroblock, various changes may be made to FIG. 9. For example, the eighth-pixel 904 could be generated in any other suitable manner.

Figure 10:
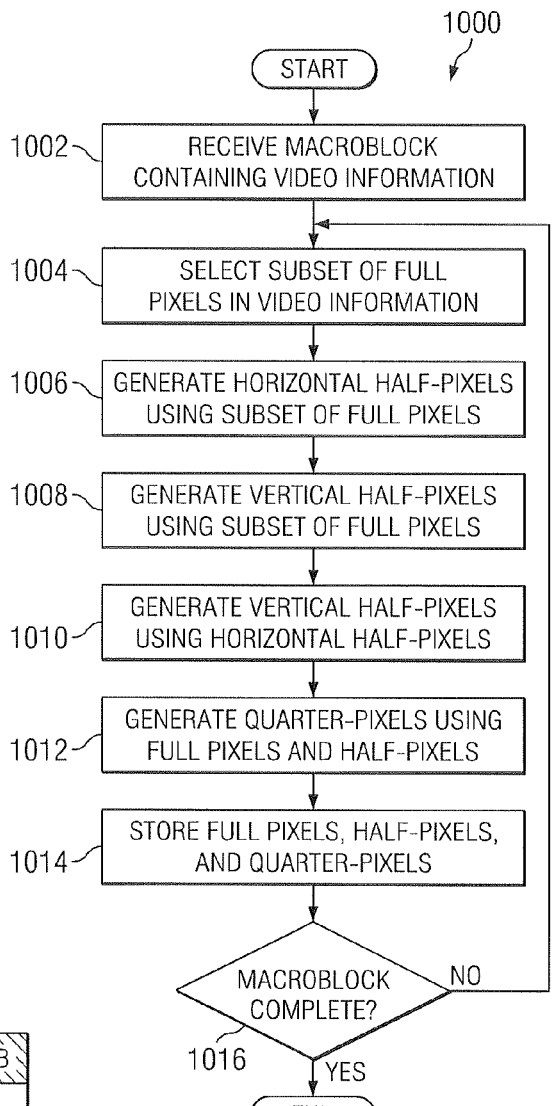
FIG. 10 illustrates an example method for fast implementation of subpixel interpolation according to one embodiment of this disclosure.

FIG. 10 illustrates an example method 1000 for fast implementation of subpixel interpolation according to one embodiment of this disclosure. For ease of explanation, the method 1000 is described with respect to the subpixel interpolator 200 of FIG. 2. The method 1000 could be used by any other device and in any other system.

The subpixel interpolator 200 receives a macroblock containing video information at step 1002. This may include, for example, the subpixel interpolator 200 receiving a 16×16 macroblock and storing the macroblock in an input buffer 202. The 16×16 macroblock may contain 256 full pixel values.

The subpixel interpolator 200 selects a subset of the full pixel values in the macroblock at step 1004. This may include, for example, the subpixel interpolator 200 storing six full pixel values from each of nine rows of the macroblock in the vector registers 204.

The subpixel interpolator 200 generates horizontal half-pixels using the subset of full pixels at step 1006. This may include, for example, each horizontal half-pixel interpolator 300 in the interpolation unit 206 receiving full pixel values from the vector registers 204. This may also include the various stages of the horizontal half-pixel interpolators 300 adding and shifting values to produce the horizontal half-pixels. This may further include storing the horizontal half-pixels in the intermediate buffer 210.

The subpixel interpolator 200 generates vertical half-pixels using the subset of full pixels at step 1008. This may include, for example, each vertical half-pixel interpolator 400 in the interpolation unit 208b receiving full pixel values from the vector registers 204. This may also include the various stages of the vertical half-pixel interpolators 400 adding and shifting values to produce the vertical half-pixels. This may further include storing the vertical half-pixels in the intermediate buffer 210.

The subpixel interpolator 200 generates vertical half-pixels using the horizontal half-pixels at step 1010. This may include, for example, each vertical half-pixel interpolator 400 in the interpolation unit 208a receiving the horizontal half-pixels from the interpolation unit 206. This may also include the various stages of the vertical half-pixel interpolators 400 adding and shifting values to produce the vertical half-pixels. This may further include storing the vertical half-pixels in the intermediate buffer 210.

The subpixel interpolator 200 generates quarter-pixels using the full pixels and half-pixels at step 1012. This may include, for example, each quarter-pixel interpolator 500 in the interpolation unit 212 receiving a full pixel and a half-pixel or two half-pixels from the intermediate buffer 212. This may also include the various stages of the quarter-pixel interpolators 500 adding and shifting values to produce the quarter-pixels.

The subpixel interpolator 200 stores the various full pixels, half-pixels, and quarter-pixels at step 1014. This may include, for example, storing the full pixels, half-pixels, and quarter-pixels in the output buffer 214. At this point, the pixel data in the output buffer 214 may be retrieved and used in any suitable manner. For example, the pixel data could be retrieved and used to perform motion compensation. However, the pixel data could be used for any other suitable purpose.

The subpixel interpolator 200 determines if the processing of the macroblock is complete at step 1016. If not, the subpixel interpolator 200 returns to step 1004 to select another subset of pixels from the current macroblock. Otherwise, the processing of the macroblock is complete, and the method 1000 ends. At this point, any suitable actions may occur, such as repeating the method 1000 for a new macroblock.

Although FIG. 10 illustrates one example of a method 1000 for fast implementation of subpixel interpolation, various changes may be made to FIG. 10. For example, although FIG. 10 illustrates the steps of the method 1000 occurring serially, various steps shown in FIG. 10 may be performed in parallel. As a particular example, steps 1006-1010 could be performed in parallel to produce a new set of half-pixels and to produce a set of quarter-pixels using a prior set of half-pixels during each iteration of the subpixel interpolator 200.

It may be advantageous to set forth definitions of certain words and phrases used in this patent document. The terms "include" and "comprise," as well as derivatives thereof, mean inclusion without limitation. The term "or" is inclusive, meaning and/or. The term "each" refers to every of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving video information comprising full pixels in a video system;
performing subpixel interpolation by the video system to generate half-pixels and quarter-pixels in parallel, by
generating horizontal half-pixels using at least some of the full pixels, each horizontal half-pixel located horizontally between two full pixels;
generating first vertical half-pixels using at least some of the full pixels, each first vertical half-pixel located vertically between two full pixels; and
generating second vertical half-pixels using at least some of the horizontal half-pixels, each second vertical half-pixel located vertically between two horizontal half-pixels,
wherein multiple half-pixels and multiple quarter-pixels are generated concurrently during the subpixel interpolation; and performing motion compensation by the video system using at least some of the half-pixels and quarter-pixels.

2. The method of claim 1, wherein the video system includes at least one of a video encoder and a video decoder.

3. The method of claim 1, wherein the first and second vertical half-pixels are generated concurrently.

4. The method of claim 1, wherein performing subpixel interpolation further comprises:
generating the quarter-pixels using at least some of the full pixels and half-pixels, each quarter-pixel located horizontally, vertically, or diagonally between one full pixel and one half-pixel or between two half-pixels.

5. The method of claim 1, wherein performing subpixel interpolation comprises:
generating a first set of half-pixels, a second set of half-pixels, and a third set of half-pixels;
generating a first set of quarter-pixels using the first set of half-pixels, the first set of quarter-pixels generated concurrently with the generation of the second set of half-pixels; and
generating a second set of quarter-pixels using the second set of half-pixels, the second set of quarter-pixels generated concurrently with the generation of the third set of half-pixels.

6. The method of claim 5, wherein generating the half-pixels and quarter-pixels comprises generating the half-pixels and quarter-pixels using a plurality of adders and a plurality of shifters and without using any multipliers.

7. The method of claim 1, wherein:
the video information comprises a 16×16 macroblock; and
performing subpixel interpolation comprises concurrently generating seventeen half-pixels and forty-eight quarter-pixels, where three half-pixels and twelve quarter-pixels are generated per full pixel.

8. A subpixel interpolator, comprising:
an input memory capable of storing video information comprising full pixels;
at least one interpolation unit capable of performing subpixel interpolation to generate half-pixels and quarter-pixels in parallel, having
a horizontal half-pixel interpolation unit capable of generating horizontal half-pixels using at least some of the full pixels, each horizontal half-pixel located horizontally between two full pixels,
a first vertical half-pixel interpolation unit capable of generating first vertical half-pixels using at least some of the full pixels, each first vertical half-pixel located vertically between two full pixels,
a second vertical half-pixel interpolation unit capable of generating second vertical half-pixels using at least some of the horizontal half-pixels, each second vertical half-pixel located vertically between two horizontal half-pixels, and
a quarter-pixel interpolation unit capable of generating the quarter-pixels using at least some of the full pixels and half-pixels, each quarter-pixel located horizontally, vertically, or diagonally between one full pixel and one half-pixel or between two half-pixels, wherein multiple half-pixels and multiple quarter-pixels are generated concurrently during the subpixel interpolation; and
an output memory capable of storing at least some of the full pixels, half-pixels, and quarter-pixels.

9. The subpixel interpolator of claim 8, wherein the subpixel interpolator is configured to be used in one of a video encoder and a video decoder.

10. The subpixel interpolator of claim 8, wherein each interpolation unit comprises a plurality of interpolators, each interpolator comprising:
a plurality of input registers capable of storing a plurality of pixel values; and
a plurality of adders and one or more shifters forming a multi-stage pipeline capable of processing the plurality of pixel values stored in the input registers.

11. The subpixel interpolator of claim 10, wherein the plurality of adders and one or more shifters are capable of generating a half-pixel defined by a formula of:

$$\text{Half-pixel} = (A - 5B + 20C + 20D - 5E + F + 16)/32$$

where A, B, C, D, E, and F represent the plurality of pixel values stored in the input registers.

12. The subpixel interpolator of claim 10, wherein the plurality of adders and one or more shifters are capable of generating a quarter-pixel defined by a formula of:

$$\text{Quarter-pixel} = (A + B + 1)/2$$

where A and B represent the plurality of pixel values stored in the input registers.

13. The subpixel interpolator of claim 8, further comprising:
a set of registers capable of storing a subset of the full pixels from the input memory, the set of registers also capable of providing at least some of the full pixels to the horizontal half-pixel interpolation unit and at least some of the full pixels to the second vertical half-pixel interpolation unit.

14. The subpixel interpolator of claim 13, further comprising:
an intermediate memory capable of receiving the full pixels from the set of registers and the half-pixels from the half-pixel interpolation units, the intermediate memory further capable of providing the full pixels and half-pixels to the quarter-pixel interpolation unit.

15. The subpixel interpolator of claim 14, wherein:
the input memory comprises a buffer capable of storing a 16×16 macroblock of full pixels;
the set of registers comprises a 9×6 set of registers;
the horizontal half-pixel interpolation unit comprises nine half-pixel interpolators;
the first vertical-pixel interpolation unit comprises four half-pixel interpolators;
the second vertical-pixel interpolation unit comprises four half-pixel interpolators;
the quarter-pixel interpolation unit comprises forty-eight quarter-pixel interpolators;
the intermediate memory comprises a buffer; and
the output memory comprises a buffer capable of storing a 64×64 block of full pixels, half-pixels, and quarter-pixels.

16. A system, comprising:
a source of video information comprising full pixels; and
a subpixel interpolator comprising:
an input memory capable of storing the full pixels;
at least one interpolation unit capable of performing subpixel interpolation to generate half-pixels and quarter-pixels in parallel, having
a horizontal half-pixel interpolation unit capable of generating horizontal half-pixels using at least some of the full pixels, each horizontal half-pixel located horizontally between two full pixels,
a first vertical half-pixel interpolation unit capable of generating first vertical half-pixels using at least some of the full pixels, each first vertical half-pixel located vertically between two full pixels, a second vertical half-pixel interpolation unit capable of generating second vertical half-pixels using at least some of the horizontal half-pixels, each second vertical half-pixel located vertically between two horizontal half-pixels, and a quarter-pixel interpolation unit capable of generating the quarter-pixels using at least some of the full pixels and half-pixels, each quarter-pixel located horizontally, vertically, or diagonally between one full pixel and one half-pixel or between two half-pixels, wherein multiple half-pixels and multiple quarter-pixels are generated concurrently during the subpixel interpolation; and an output memory capable of storing at least some of the full pixels, half-pixels, and quarter-pixels.

17. The system of claim 16, wherein the system includes at least one of a video decoder and a video encoder.

18. The system of claim 16, wherein each interpolation unit comprises a plurality of interpolators, each interpolator comprising:

a plurality of input registers capable of storing a plurality of pixel values; and a plurality of adders and one or more shifters forming a multi-stage pipeline capable of processing the plurality of pixel values stored in the input registers.

19. The system of claim 16, wherein the subpixel interpolator further comprises:

a set of registers capable of storing a subset of the full pixels from the input memory, the set of registers also capable of providing at least some of the full pixels to the horizontal half-pixel interpolation unit and at least some of the full pixels to the second vertical half-pixel interpolation unit.

20. The system of claim 16, wherein:

the source of video information comprises a deblocking filter in one of: a video encoder and a video decoder; and the video encoder or video decoder further comprises:

an inverse quantization/transform unit capable of receiving quantized discrete cosine transform (DCT) coefficients and performing inverse quantization and inverse DCT transform functions using the DCT coefficients to produce a first signal;

a combiner capable of combining the first signal with a second signal to produce the video information comprising the full pixels and providing the video information to the deblocking filter; and a motion compensator capable of receiving motion vectors and the half-pixels and quarter-pixels, the motion compensator also capable of generating the second signal.

* * * * *

UNITED STATES PATENT AND TRADEMARK OFFICE
CERTIFICATE OF CORRECTION

| | | |
|---|---|---|
| PATENT NO. | : 7,653,132 B2 | Page 1 of 1 |
| APPLICATION NO. | : 11/096906 | |
| DATED | : January 26, 2010 | |
| INVENTOR(S) | : Philip P. Dang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1215 days.

Signed and Sealed this

Twenty-eighth Day of December, 2010

David J. Kappos
*Director of the United States Patent and Trademark Office*